No. 772,463. PATENTED OCT. 18, 1904.
W. F. KRAMER.
MOTOR VEHICLE.
APPLICATION FILED MAR. 23, 1904.
NO MODEL. 4 SHEETS—SHEET 2.
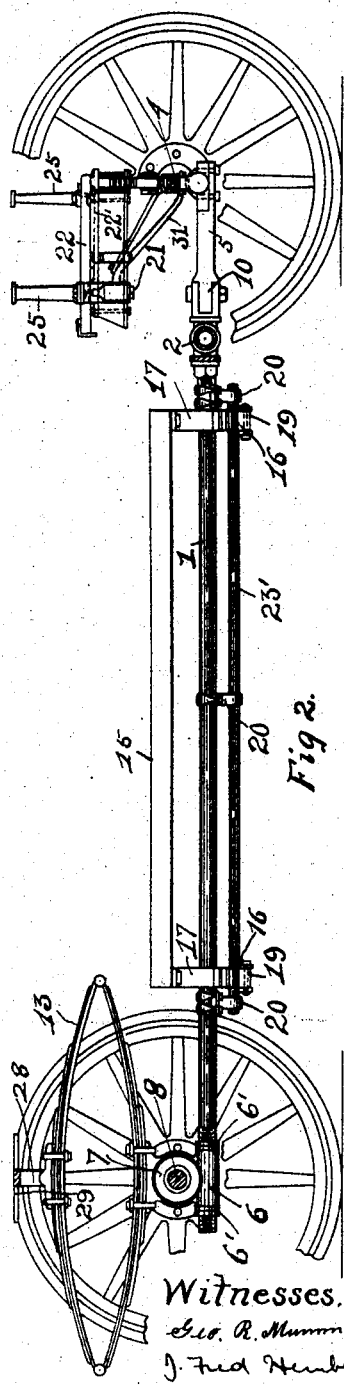
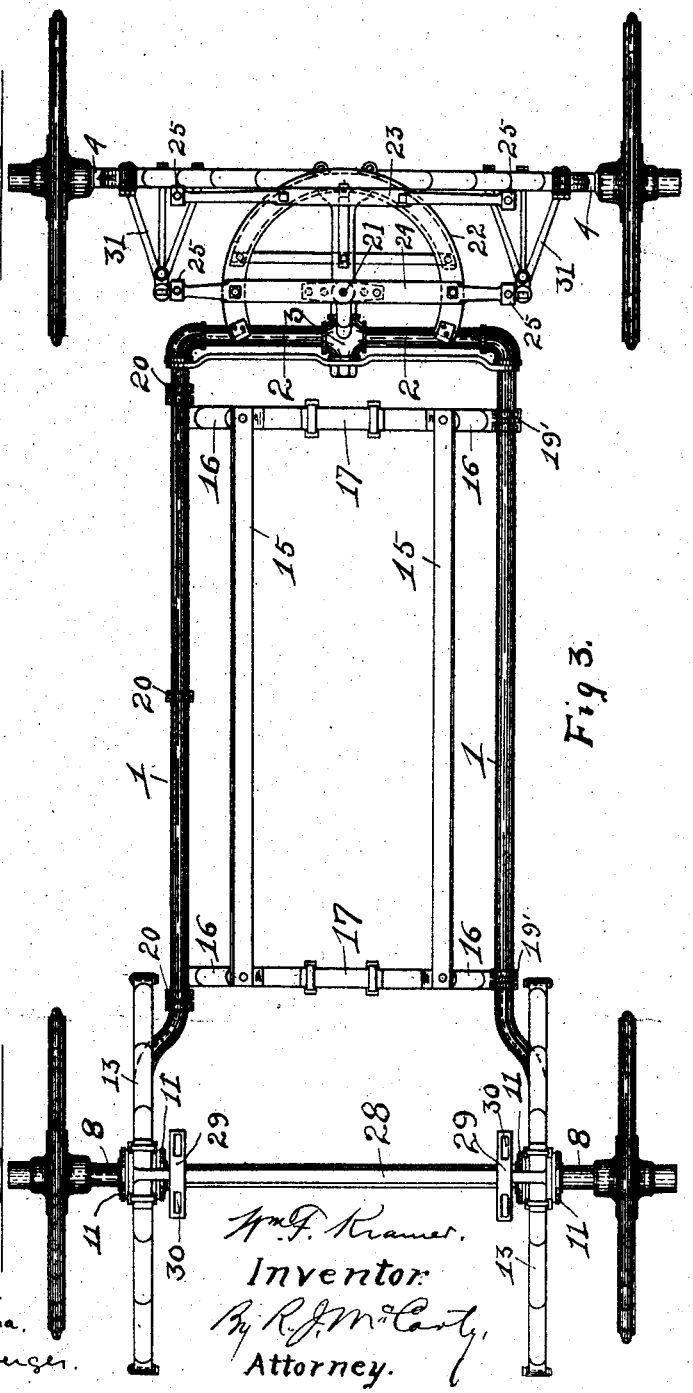
Witnesses.
Geo. R. Mumma.
J. Fred Hemberger.
Inventor.
Wm. F. Kramer.
By R. J. McCarty,
Attorney.

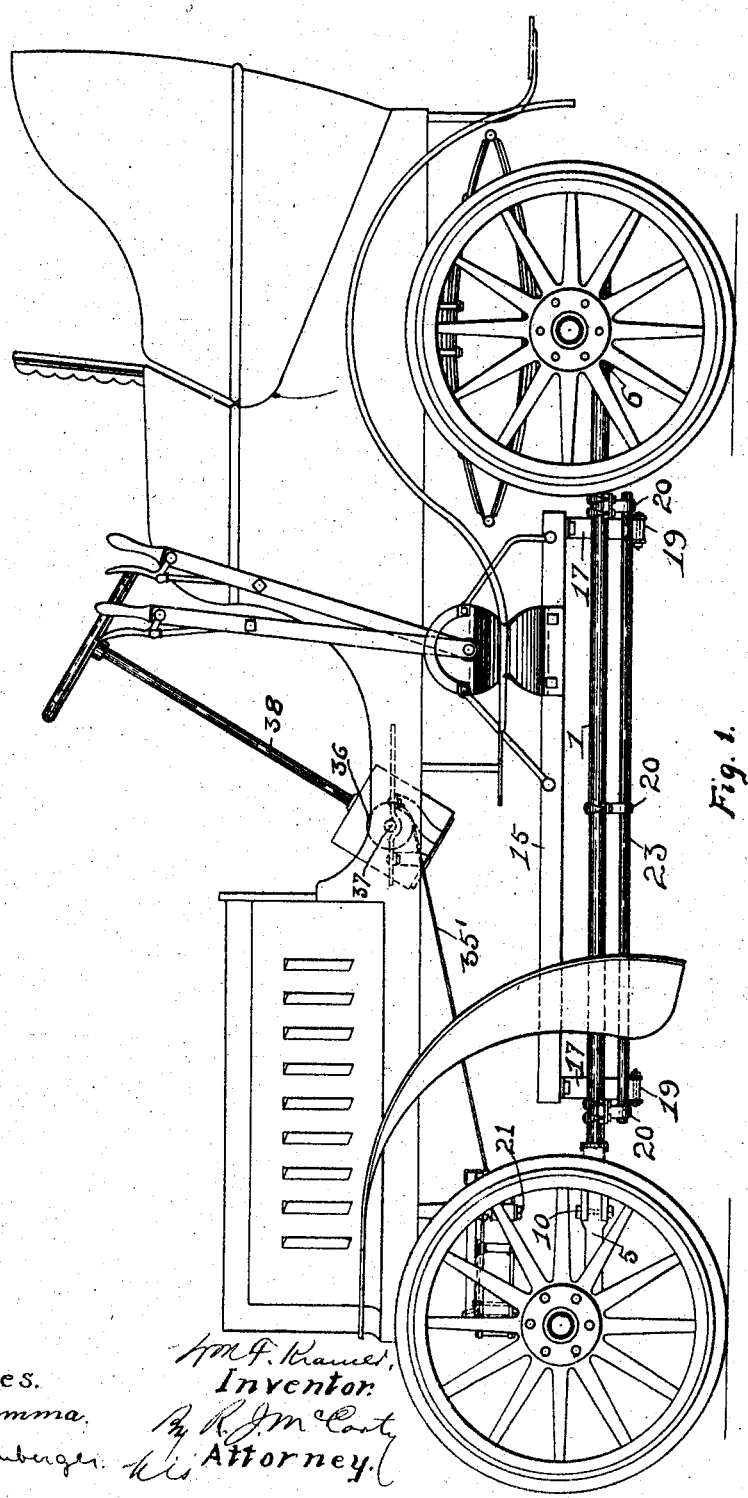

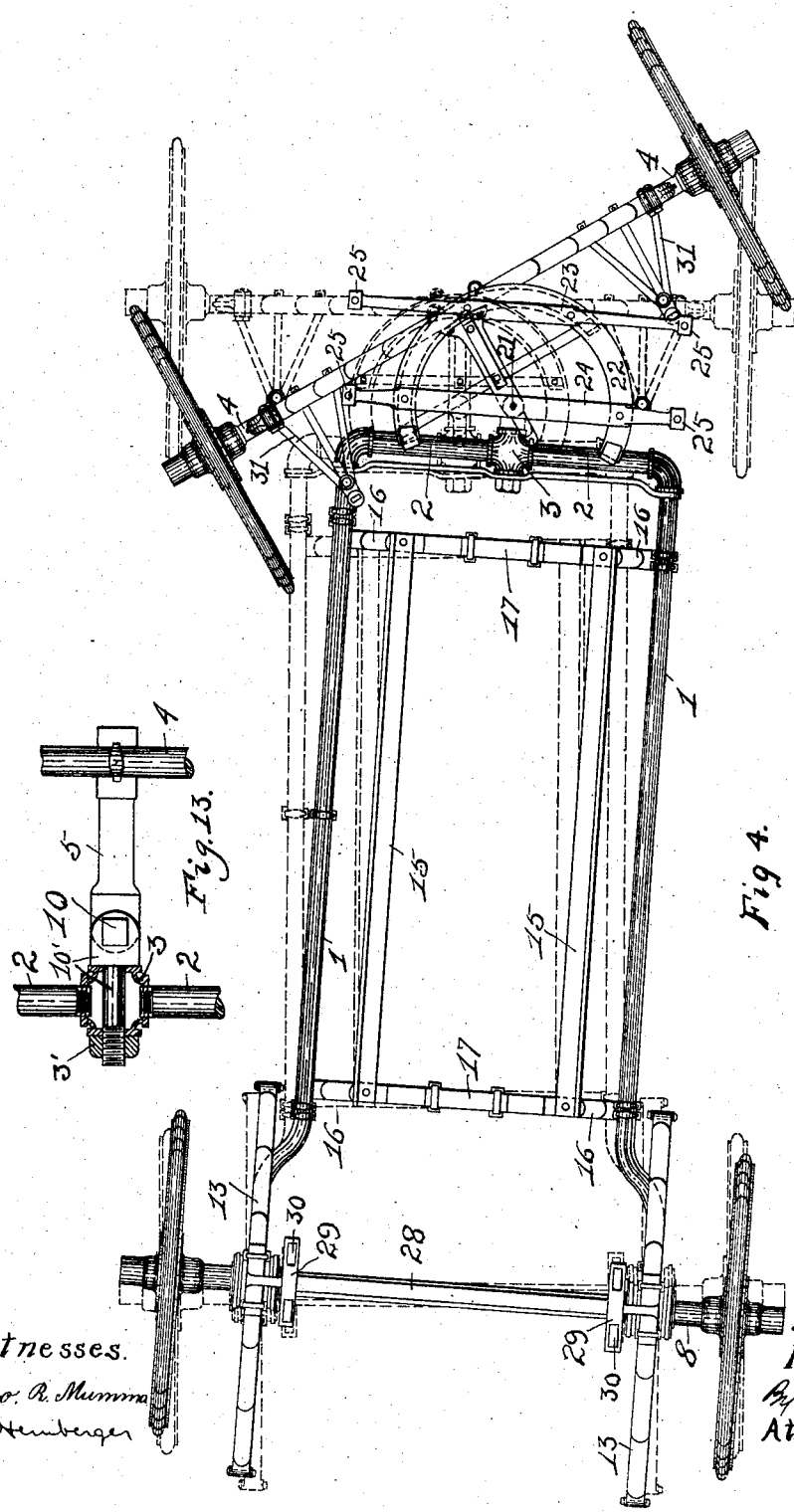

No. 772,463. PATENTED OCT. 18, 1904.
W. F. KRAMER.
MOTOR VEHICLE.
APPLICATION FILED MAR. 23, 1904.
NO MODEL. 4 SHEETS—SHEET 4.
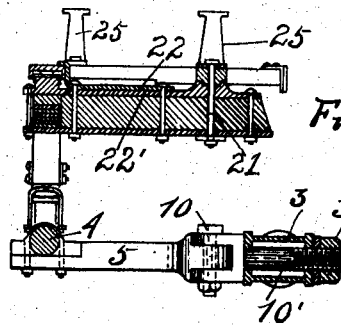
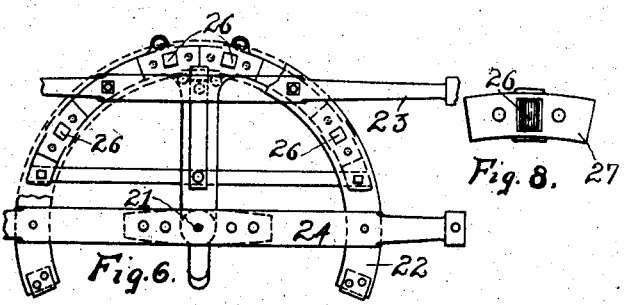
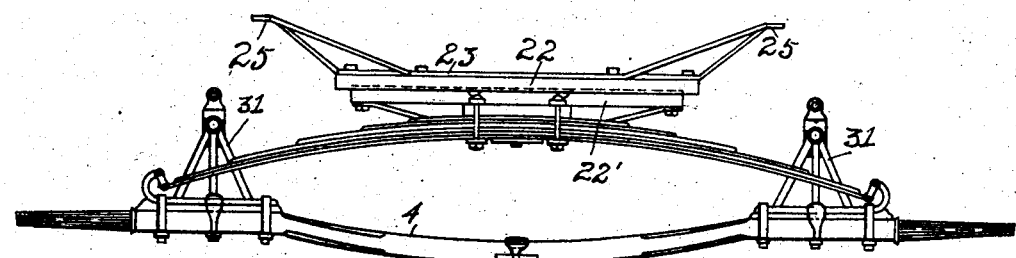
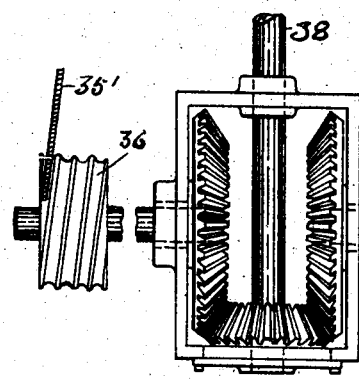
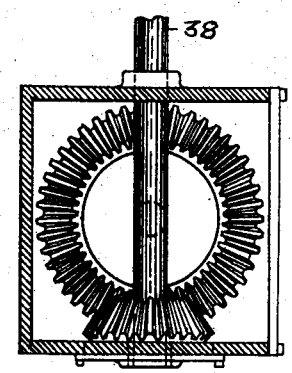
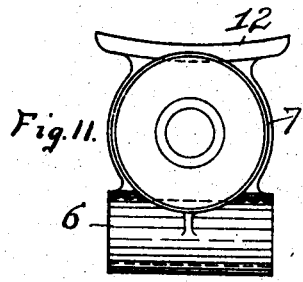
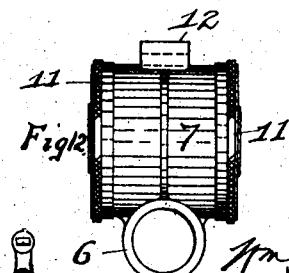
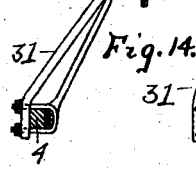
Witnesses.
Geo. R. Mumma.
J. Fred Hamberger.
Wm. F. Kramer,
Inventor.
By R. J. McCarty
his Attorney.

No. 772,463. Patented October 18, 1904.

UNITED STATES PATENT OFFICE.

WILLIAM F. KRAMER, OF DAYTON, OHIO.

MOTOR-VEHICLE.

SPECIFICATION forming part of Letters Patent No. 772,463, dated October 18, 1904.

Application filed March 23, 1904. Serial No. 199,538. (No model.)

*To all whom it may concern:*

Be it known that I, WILLIAM F. KRAMER, a citizen of the United States, residing at Dayton, in the county of Montgomery and State of Ohio, have invented certain new and useful Improvements in Motor-Vehicles; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in motor-vehicles, and the improvements relate to various features of the running-gear.

The various objects of the invention are, first, to provide a solid or one-piece front or steering-axle which is devoid of any knuckles or break-joints at the wheels or elsewhere. The great disadvantage attending the knuckled steering-axles are well known to those familiar with horseless vehicles; but, briefly stated, they are due to the danger of breakage of the joints when steering or turning corners or to the loosening of set-screws and bolts, which rattle out under the constant motion of the vehicle, and thus become a very dangerous element to the occupants of the vehicle. For example, if a single bolt in a steering-knuckle becomes detached the vehicle becomes entirely unmanageable. Secondly, a further object of the invention is to provide a running-gear frame with the steering-axle and front end of the vehicle-body so connected to the running-gear frame that a very short and decided turn can be made. In making such turn the running-gear frame moves outwardly at its front end and permits the inner steering-wheel to move inwardly to a sufficient extent to make a short turn. This movement of the running-gear is caused by the upper and lower king-bolts being set back of the center of the axle. Thirdly, a further object of my invention is to provide a running-gear which will protect the tires—in other words, which will prevent the tires from being thrown off or torn from the wheels in sudden turns. This is often due to the steering-wheels assuming an angle approximately at right angles to the frame, and in consequence thereof transverse strain is placed upon the tires, or the tires are subjected to a dragging when the vehicle is in motion, which is disastrous in its effects. It is well known that the possibility of a tire leaving a wheel is an element of great danger to the occupants of the vehicle.

A further object of my invention is to mount the motor and the various mechanisms thereof below the body of the vehicle and upon a frame built especially for this purpose, so that the unpleasant vibrations of the driving mechanism may be avoided. In contributing to this result I also mount the body of the vehicle upon separate independent springs which are supported upon the rear axle and upon the upper fifth-wheel, and, further, by my method of hanging the driving mechanism the body is cleared of all machinery, which is absolutely necessary for a practical commercial wagon.

Other features comprised in the invention will be hereinafter described and claimed.

Preceding a detail description of the invention reference is made to the accompanying drawings, of which -

Figure 1 is a side elevation of a motor-vehicle constructed in accordance with my invention. Fig. 2 is a side elevation of the running-gear frame with the body removed. Fig. 3 is a top plan view of the running-gear frame with the body removed. Fig. 4 is a similar view of the running-gear frame, showing the different positions assumed by both the steering-axle and the frame in making turns. Fig. 5 is a cross-section of the top and bottom fifth-wheels, showing the connections between the steering-axle and the frame. Fig. 6 is a top plan view of the top and bottom fifth-wheels. Fig. 7 is a front elevation of the steering-axle. Fig. 8 is a detail view of one of the caps for the roller-bearings located between the members of the fifth - wheel. Figs. 9 and 10 are details of the steering mechanism. Figs. 11 and 12 are detached views of the rear axle and frame bearings. Fig. 13 is a detail plan view of the knuckle-joint between the steering-axle and the center of the front end of the frame and also showing the oscillating joint connecting with the center of the front end of the frame. Figs. 14 and 15 are detached views of the brackets connecting the steering-axle with the steering device.

Throughout a detail description of the invention similar reference characters indicate corresponding parts.

1 1 designate the side tubes or rails of the running-gear frame, which are connected at their forward ends by means of a two-part cross tube or rail 2, the ends of which are secured to a coupling or bearing 3.

4 designates the front or steering axle, which is solid throughout its length and has a suitable curvature, as shown in Fig. 7. Projecting from the center of said steering-axle is a reach 5, which is pivoted by a lower king-bolt 10 to an oscillating pin 10', said pin passing through the coupling or bearing 3 and secured by a nut 3'. The steering-axle 4 has lateral movement on the king-bolt 10 and oscillating movement on the pin 10'. The lateral movements on the king-bolt 10 are due to turning, and the oscillating movements on pin 10' are due to passing over obstructions or uneven ground. The rear ends of the side rails 1 1 are slipped into the sleeves 6 and are secured by double jam-nuts 6' at each end of said sleeves. The sleeves 6 are integral parts of the bearings 7 7, which receive the rear axle 8. These bearings 7 7 house roller-bearings for the axle and are closed at each end by dust-proof caps 11, which are threaded and screwed onto the opposite ends thereof. The upper ends of said bearings have suitable parts 12 12, which provide seats for the lower side of the rear springs 13, which are clipped thereto in the usual manner. The rear end of the vehicle-body is hung upon a spring-bar 28, which is clipped to the upper sides of the springs 13, and has cross-pieces or Ts 29 adjacent to said springs, which are provided with oblong slots 30. These slots permit of a movement of the rear axle and springs backwardly or forwardly to properly adjust the driving devices—for example, to take up any unnecessary slackness in the driving-chain. The driving devices may be a chain, belt, or gearing connecting upon the rear axle or wheels by means of the usual compensating gearing extending forward to slide transmission or clutch-gearing. None of these features, however, are comprised in the present invention. Consequently it has not been deemed necessary to illustrate the same. The power mechanism is supported on a framework having its own independent springs 16, that are suspended from the side rails or tubes 1 1. The said frame consists of parallel bars 15 15, which are attached to the springs 16 16 at each end by means of cross or spring bars 17 17, which are clipped to said springs. One end of said springs is connected to a stationary knuckle 19', suspended from one of the side rails or tubes 1 by means of clips or bolts, and the other ends of said springs are connected to an equalizer-bar 23' at 19. Said equalizer-bar is suspended from the other side rail or tube 1 by eye clips or hangers 20. The upper king-bolt 21, it will be observed in Fig. 2, lies in vertical alinement with the lower king-bolt 10, and both form a common pivot at the front end of the running-gear when the steering-wheels are turned. It will be observed that owing to the lower king-bolt 10 between the steering-axle and the running-gear frame and the upper king-bolt 21 being in vertical alinement the running-gear frame is thrown outwardly at its front end to the position shown in full lines in Fig. 4, thus permitting a short turn to be made with the steering-axle, which could not otherwise be made if the running-gear frame was devoid of such movement in operating the steering-axle. The upper member 22 of the fifth-wheel has body bars or braces 23 24 attached thereto, the ends of said braces extending upwardly, as at 25, to suit the elevation of the body. The upper king-bolt 21 passes through the rearward body-bar 24. Between the two members of the fifth-wheel there is a series of roller-bearings 26, which are mounted in the lower fifth-wheel 22' and held in position by caps 27. (Shown in Fig. 8.)

31 designates brackets which are rigidly attached to the steering-axle 4 and are each provided with a socket 32, that receives pivot-bolt 33, made secure therein. The top of the bolt 33 has an eye which receives a threaded swivel-bolt 35, with lock-nuts to take up lost motion. Chains or cables 35' are connected with the swivels, and the back ends of these connections 35' are secured to right and left hand worms 36 on shaft 37, said shaft being geared to steering-handle 38, as shown in Fig. 9. The shaft 37 is turned from said handle 38 by suitable gearing. (Shown in Figs. 9 and 10.)

In making a turn the vehicle-body travels in a direction away from the inner steering-wheel and allows a very short turn to be made. The upper king-bolt 21 and the lower king-bolt 10 serve as a common pivot upon which the front end of the vehicle-body and the steering-axle move in unison. The vehicle-body being attached upon separate springs to the front and rear axles affords an easy vibration. The body being entirely free from the load upon the running-gear frame is relieved of the vibrations due to the running of the motive machinery.

In the event that either a front or rear wheel should strike an obstruction or drop into a depression or hollow in the ground the motive-machinery springs at each end of the frame will yield uniformly and will prevent the possibility of throwing the mechanism out of alinement and will prevent any strain upon the driving mechanism. In the employment of common bearings for the rear axle and for the connection of the rear ends of the side rails or tubes 1 1 the said rear axle may be shifted backward or forward and kept in proper alinement at all times with the various working parts by adjusting the lock-nuts on the threaded ends of rails or tubes. By providing the oscillating pin 10' between the center of the forward end of the running-gear frame any strain to the framework due to dropping of any of the wheels is avoided. The upper member 22 of the fifth-wheel is connected to the forward end of the body through the body-bars 23 24, and the king-bolt 21 pivots in the center of the rearward body-bar 24, so that the vehicle-body, together with the forward end of the running-gear frame, are pivoted in vertical alinement, as hereinbefore stated, and move upon exact centers in each steering operation of the front axle. The lower member 22' of the fifth-wheel is clipped to the top of the center of the front cross-spring.

It will be seen from Fig. 4 that in turning the front axle it throws the body oppositely, thereby throwing the rear wheels and allowing them to move in a circle in relation to the front wheels, whereby all strain upon the tires is avoided.

Having described my invention, I claim—

1. In a motor-vehicle, a running-gear frame, a solid steering-axle, a steering-handle, means connected with said axle for turning the axle in either direction from the steering-handle, and connections between the steering-axle and the running-gear frame permitting said axle to turn and permitting said axle and the running-gear frame to rise or fall in passing over obstructions or depressions.

2. In a motor-vehicle, a running-gear frame, and a frame supporting the motive-power mechanism, springs upon which said last-named frame is supported, said springs being attached at one end to the running-gear frame, an equalizer-bar suspended from the other side of said running-gear frame and to which the other ends of said springs are attached.

3. In a motor-vehicle, a running-gear frame, roller or ball bearing housings for the rear axle, means on said housings for detachably connecting the rear ends of the side rails or tubings of the running-gear frame, and means for connecting the rear end of the wagon-body with the springs, and whereby the rear axle and springs may be shifted rearwardly or forwardly to adjust the connections between the power-transmission devices.

4. In a motor-vehicle, a solid steering-axle, a reach extending from said axle, a running-gear frame, an oscillating pin connected to the front end of said frame, a vertical king-bolt connecting the rear end of the reach with said oscillating pin, a fifth-wheel, and a king-bolt connecting the vehicle-body with said fifth-wheel, said king-bolt being in vertical alinement with the king-bolt of the reach.

5. In a motor-vehicle, a running-gear frame, a supplemental frame for supporting the motive-power mechanism, the latter frame being suspended below the axles of the running-gear frame, means by which said supplemental frame is thus suspended, and means for adjusting the position of the rear axle of the running-gear frame to compensate for the wear in the power-transmission mechanism.

6. In a motor-vehicle, a running-gear frame, a steering-axle, a reach extended rearward from said axle, and a king-bolt and pin connecting said reach with the running-gear frame and forming two pivots between the front axle and the running-gear frame by means of which the steering-axle is permitted to have movements at right angles to each other.

7. In a motor-vehicle, a steering-axle, a running-gear frame, knuckle or oscillating connections connecting said axle with the running-gear frame, one of said connections permitting the axle to move in opposite directions, and the other of said connections permitting said axle and the running-gear frame to rise or fall independently of each other.

8. In a motor-vehicle, a running-gear frame, a solid steering-axle, a reach extended rearwardly from said axle, two horizontally-alined connections between said reach and the frame, and an upper king-bolt in alinement with the forward one of said connections and forming a pivot upon which the fifth-wheel turns.

In testimony whereof I affix my signature in presence of two witnesses.

WILLIAM F. KRAMER.

Witnesses:
R. J. McCarty,
John W. McKeown.